(12) United States Patent
Murray

(10) Patent No.: US 8,662,310 B2
(45) Date of Patent: Mar. 4, 2014

(54) PLATINUM GROUP METAL RECOVERY FROM POWDERY WASTE

(75) Inventor: Angela Janet Murray, Ayrshire (GB)

(73) Assignee: The University of Birmingham, Birmingham (GB)

(*) Notice: Subject to any disclaimer, the term of this patent is extended or adjusted under 35 U.S.C. 154(b) by 179 days.

(21) Appl. No.: 13/255,178

(22) PCT Filed: Mar. 25, 2010

(86) PCT No.: PCT/GB2010/000552
§ 371 (c)(1),
(2), (4) Date: Sep. 7, 2011

(87) PCT Pub. No.: WO2010/109191
PCT Pub. Date: Sep. 30, 2010

(65) Prior Publication Data
US 2012/0000832 A1  Jan. 5, 2012

(30) Foreign Application Priority Data
Mar. 27, 2009 (GB) .................. 0905324.0

(51) Int. Cl.
B07B 9/00 (2006.01)

(52) U.S. Cl.
USPC .......... 209/2; 209/3; 209/423; 75/10.19; 75/10.67

(58) Field of Classification Search
USPC .......... 75/10.19; 373/60; 209/2, 3, 3.1
See application file for complete search history.

(56) References Cited

U.S. PATENT DOCUMENTS

| 2,558,639 | A | * | 6/1951 | Woock .......................... 209/423 |
| 4,225,422 | A |   | 9/1980 | Trevoy et al. |
| 4,428,768 | A | * | 1/1984 | Day ............................. 75/10.19 |
| 4,512,879 | A |   | 4/1985 | Attia et al. |
| 4,543,178 | A |   | 9/1985 | Goldstein |
| 4,870,655 | A |   | 9/1989 | Ward |
| 5,279,464 | A |   | 1/1994 | Giegerich et al. |

(Continued)

FOREIGN PATENT DOCUMENTS

| BR | 9505545 | 11/1995 |
| CA | 2520275 | 3/2006 |

(Continued)

OTHER PUBLICATIONS

Platinum emissions and levels in motorway dust samples: influence of traffic characteristics; Ward et al.; Science of the Total Environment; 2004; pp. 457-463.

*Primary Examiner* — Terrell Matthews
(74) *Attorney, Agent, or Firm* — Wells St. John P.S.

(57) ABSTRACT

The invention relates to a method for increasing the concentration of platinum group metals in urban waste material. The method comprises obtaining particles of urban waste material; screening the particles of urban waste material by size,— selecting particles of urban waste material that lie within a defined size range; and processing the selected particles using at least one physical or chemical technique whereby to increase the concentration of platinum group metals to at least 5 ppm. The invention also relates to an apparatus for increasing the concentration of platinum group metals in particulate urban waste material. The apparatus comprises: a drying unit (4), a particle size screening unit (5); and one or more processing units for effecting platinum group metal concentration of the particulate urban waste material by physical and/or chemical techniques, in particular a magnetic separation unit (7) and a froth flotation cell (9).

9 Claims, 1 Drawing Sheet

(56) References Cited

U.S. PATENT DOCUMENTS

Figure 1:
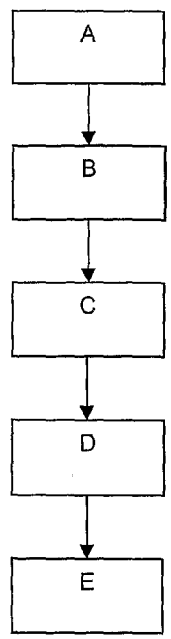

| | | | |
|---|---|---|---|
| 5,783,062 A * | 7/1998 | Fogel et al. | 205/718 |
| 7,134,619 B2 * | 11/2006 | Soe et al. | 241/19 |
| 7,867,317 B2 * | 1/2011 | Lee et al. | 75/704 |
| 2010/0071507 A1 * | 3/2010 | Lee et al. | 75/10.67 |

FOREIGN PATENT DOCUMENTS

| | | |
|---|---|---|
| CN | 2010800099996OA | 7/2013 |
| DE | 3432916 A1 | 3/1986 |
| DE | 19726105 | 12/1998 |
| GB | 0905324 | 6/2009 |
| JP | 2001-046975 | 2/2001 |
| JP | 2001046975 | 2/2001 |
| RU | 2001133 | 12/1991 |
| RU | 2098190 C1 | 12/1997 |
| RU | 2158637 C2 | 11/2000 |
| RU | 2185451 C2 | 7/2002 |
| RU | 2192311 C2 | 11/2002 |
| WO | WO 2006/024886 A1 | 3/2006 |
| WO | PCT/GB2010/000552 | 7/2010 |

\* cited by examiner

PLATINUM GROUP METAL RECOVERY FROM POWDERY WASTE

CROSS REFERENCE TO RELATED APPLICATION

This application is a 35 U.S.C. §371 of and claims priority to PCT International Application Number PCT/GB2010/000552 (Publication No. WO 2010/109191 A1), which was filed 25 Mar. 2010, and was published in English, and this application claims priority to UK Patent Application No. 0905324.0 which was filed 27 Mar. 2009, and the teachings of which are incorporated herein by reference.

The invention relates to the recovery of metals from waste materials, and more particularly to the recovery of platinum group metals from bulk urban waste material such as roadside dust.

Catalytic converters are widely used in internal combustion engines to reduce the emission of harmful pollutants in exhaust gases. Catalytic converters typically comprise a ceramic honeycomb support coated with a wash coat. The wash coat is often a mixture of silica and alumina which increases the surface area of the converter. The catalyst itself is usually a precious metal such as platinum, palladium or rhodium, or a mixture thereof, which is incorporated into the wash coat before the coat is applied to the ceramic support. Platinum, palladium and rhodium are collectively known as platinum group metals (PGMs).

PGMs are scarce natural resources of high value. Primary production (i.e. mining) of PGMs is concentrated in three countries and is linked to a considerably negative environmental impact. For example, over ten tonnes of ore is mined for every ounce of pure platinum produced.

Methods have been proposed for the recovery of PGMs from waste products, in particular from catalytic converters. U.S. Pat. No. 4,428,768 discloses a process for the recovery of PGMs from catalytic converters in which particulate ceramic material bearing the wash coat and PGMs is mixed with one or more fluxes and a particulate iron collector material. The mixture is heated in a high intensity plasma arc furnace to produce a molten metallic phase and a molten slag phase. The two phases are separated and the PGMs are separated from the molten metallic phase. U.S. Pat. No. 4,870,655 discloses an electric arc furnace and a furnace system for the recovery of precious metals from spent material.

However, the recycling of catalytic converters has been found to recover only a small percentage of the initial PGM content, typically 20-30%, due to depletion of PGMs during use. During use, catalytic converters are physically stressed. This causes PGMs to be released into the exhaust gas stream and deposited onto the roadside as dust. Eventually the amount of PGMs in the catalyst is reduced to a level at which the catalytic converter is no longer effective and must be replaced.

Measurements have shown that the concentration of PGMs in roadside dust is in the order of 1 part per million (ppm), which is too low for economic recovery by current methods, such as the methods disclosed in U.S. Pat. No. 4,428,768 and U.S. Pat. No. 4,870,655. Roadside dust is swept away by local authorities and deposited in landfill sites. It is estimated that around £64 million of PGMs (based on May 2008 prices) is lost to landfill each year in the UK.

The object of the invention is to provide a method and apparatus for increasing the concentration of PGMs in urban waste material such as roadside dust to a concentration at which PGMs can be economically recovered by known methods.

According to a first aspect of the present invention, there is provided a method for increasing the concentration of platinum group metals in urban waste material comprising:
  obtaining particles of urban waste material;
  screening the particles of urban waste material by size;
  selecting particles of urban waste material that lie within a defined size range; and
  processing the selected particles using at least one physical or chemical technique whereby to increase the concentration of platinum group metals to at least 5 ppm.

As used herein "urban waste material" includes all forms of bulk waste that potentially contain low concentrations of platinum group metals. Examples include incinerator ash, industrial waste material and road dust. Preferably the method is applied to road dust. The term road dust includes sweepings from all parts of the road and road side as well as the gulley sweepings and waste captured in drains and drainage systems.

Preferably, the method results in a platinum group metal concentration of at least 10 ppm, more preferably 20 ppm and most preferably 40 ppm.

Preferably the particles of urban waste material are dried prior to screening, for example by heating.

Preferably the screening comprises sieving the particles of urban waste material.

Although not wishing to be bound by theory, the success of the invention is predicated on a realisation by the inventor that a significant portion of the PGM particles released from automotive catalysts are released associated with alumina and/or other ceramic wash coat material deriving from the catalyst support material onto which the particles are deposited during manufacture.

Preferably the defined size range is 50 μm to 300 μm, more preferably 100 μm to 275 μm and most preferably 125 μm to 250 μm. The association with wash coat particles determines the particle size ranges most associated with the PGM.

The size-selected particles may be further processed by any one or a combination of the following physical techniques:
(i) magnetic separation,
(ii) electrostatic separation (e.g. high tension separation), and
(iii) gravimetric concentration (e.g. Falcon concentration).

Magnetic separation is preferred. Examples of magnetic separation techniques include (high intensity) induced roll magnetic separation, wet magnetic separation, magnetic disc separation and rare earth roll separation, induced roll magnetic separation being preferred. Conveniently magnetic separation works best on particles in the size range 100 to 300 μm. The PGM particles are nano- or micro-particles and these sizes do not work well with magnetic separation so being associated with the wash coat particle brings the PGM into a size range where they can be effectively separated.

The size-selected particles may be further processed by the chemical technique of froth flotation. Work to make the PGM hydrophobic failed to recover sufficient PGM and it was this failure that led the inventor to realise that the PGM was associated with the wash coat and all parts of the process were better optimised to account for this surprising discovery. Thus, the chemical reagents for the froth flotation are selected to make the wash coat material hydrophobic rather than to make the PGM hydrophobic.

In a preferred embodiment of the invention, the size-selected particles are subjected to magnetic separation followed by at least one of gravimetric concentration and froth flotation.

It will be appreciated that the method encompasses multiple iterations of the same physical or chemical technique, which may optionally be interspersed with at least one other physical or chemical technique.

According to a second aspect of the invention, there is provided apparatus for increasing the concentration of platinum group metals in particulate urban waste material comprising:
a particle size screening unit; and
one or more processing units for effecting platinum group metal concentration of the particulate waste by physical and/or chemical techniques.

Preferably, the apparatus also comprises a drying unit arranged to dry the particulate urban waste material before it is passed to the screening unit.

In those embodiments incorporating a drying unit, means, such as a conveyor belt, are provided to transfer the dried particles to the particle size screening unit.

Depending on the nature of the feedstock, it may also be desirable for the apparatus to include a further screen, arranged to separate bulk waste material from the particulate waste material before the latter is passed to the particle size screening unit. In some embodiments this function may be effected by the particle size screening unit.

Preferably the screening unit comprises a vertical stack of sieves with diminishing mesh size from top to bottom, means for agitating the sieves and means for collecting the particle fractions collected by the sieves.

The processing unit may be one suitable for carrying out any of the techniques described hereinabove in relation to the method of the invention. In a preferred series of embodiments, the processing unit is a magnetic separation unit comprising a high intensity induced roll magnetic separator. In a highly preferred embodiment, a second processing unit in the form of a froth flotation cell is provided to receive the material concentrated by the magnetic separation unit.

The apparatus may be built to any scale and so could be mobile or a static unit. The apparatus can be designed to operate in batch mode or continuous mode (preferred).

Figure 2:
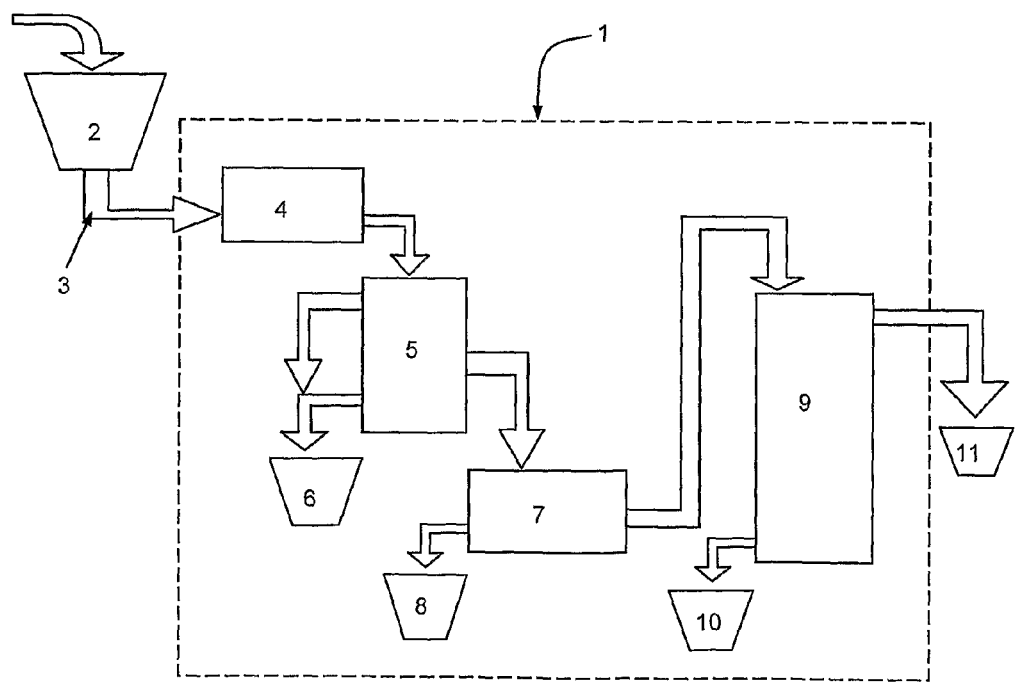

Embodiments of the invention will now be described by way of example with reference to the accompanying figures, in which:

FIG. 1 is a flow chart showing a process in accordance with the first aspect of the present invention; and FIG. 2 is a schematic diagram illustrating an apparatus in accordance with the second aspect of the invention.

FIG. 1 shows schematically a preferred embodiment of the method of the invention. The first stage of the method is collection of urban waste material such as roadside dust (A). The next stage is drying to remove moisture from the dust (B). The drying time will depend in a number of factors, including the type of oven, the surface area to volume ratio of the dust particles, and the moisture content of the dust. The drying process makes subsequent processing steps more effective and can be carried out in any known heating facility suitable for the drying of bulk particulate material. The drying step may be a batch process or may be carried out as a continuous process on a conveyor system.

Following drying, the dust is screened by particle size (C). Different sized particles are separated into different fractions. Analysis of road dust samples has shown that the concentration of PGMs varies between particle size ranges. The preferred particle size ranges selected for further processing are those between 125 and 250 µm. Particles outside of this size range are discarded as the PGM concentration is currently too low for the PGMs to be economically recovered. However, the size range of particles selected for further processing may change with fluctuations in the value of PGMs.

Following particle size screening the selected particle size ranges are passed to a magnetic separation stage (D). In a preferred embodiment the magnetic separation process is dry high intensity induced roll magnetic separation, although alternative magnetic separation processes may be used including, but not limited to, wet high intensity magnetic separation, disc separation and rare earth roll separation.

The product of the magnetic separation stage is then further processed by froth flotation (E) to increase the PGM concentration to a level suitable for processing through known smelting operations, such as those normally applied to the processing of primary ore. It will be understood that the material may be subjected to multiple iterations of froth flotation. While froth flotation is the preferred process, other physical or chemical processes may be employed to increase the PGM concentration in the dust. One example of an alternative method is falcon concentration. The PGM-rich material may then be subject to an additional drying stage (not shown), as dried material is preferred for the smelting process.

FIG. 2 shows a preferred embodiment of the PGM recovery apparatus 1, which comprises a drying unit 4, a screening unit 5, a magnetic separation unit 7, and a froth flotation cell 9. Bulk urban waste material is delivered into a storage hopper 2, from which the waste material is fed by manual or automated means 3 into a drying unit 4. The drying unit 4 may be operated on a continuous basis in which case the waste material passes through the drying unit 4 on a conveyor belt (not shown). A conveyor belt may also be used to deliver the dried material from the drying unit 4 to the screening unit 5.

The screening unit 5 comprises a stack of sieves of varying mesh (not shown) mounted on a vibrating shaker (not shown). The sieves are arranged to pass particles of diminishing size down the stack. The screening unit separates particles within the required size range from material that is too coarse or too fine. The coarse material (deposited near the top of the stack) and fine material (towards the lower end or passing through the stack) are collected in a suitable container 6 for removal. The coarse and fine waste materials may be collected together or separately.

The particles in the required size range of 125 to 250 µm are selected from the screening unit 5 and passed to the magnetic separation unit 7, in this case a high intensity induced roll magnetic separator, although other magnetic separation units may be used. The non-magnetic material is collected in a suitable container 8 for disposal or recycling.

The magnetic material is collected and delivered to the froth flotation cell 9. The waste material is collected in a suitable container 10 for disposal or recycling. The PGM-rich float is collected in a container 11 for transfer to a smelting plant (not shown) for recovery of PGMs. An additional drying unit (not shown) may be added to the PGM recovery apparatus 1 for drying the PGM-rich float recovered from the froth flotation cell 9, as dried material is preferred for the smelting process. The material may be transferred between the different units in the apparatus 1 by manual or automated means. The waste storage containers 6, 8, 10 may be separate units (as shown), or they may be a single unit to which all waste materials are transferred for disposal.

The PGM recovery apparatus 1 may be a static housed unit within a designated site or building, or it may be mobile unit that travels to waste collection points. A static unit may be associated with a smelting plant so that the product of the PGM recovery apparatus could be easily transferred directly to the smelting process.

Example 1

A 20 kg sample of road dust was dried at 80° C. for 4 hours in a closed oven without fan assisted air circulation. The dried dust was sieved, and particles between 125 and 250 μm were selected for further processing by dry high intensity induced roll magnetic separation. The settings for the magnetic separator were as follows:

Low magnetic setting=0.05T

Medium magnetic setting=0.2T

High magnetic setting=1.4T

Table 1 shows the concentration of PGMs in the selected particle size fractions after separation by the high magnetic setting with the initial concentrations for the 125-250 μm particles in table 2 for comparison.

TABLE 1

| Size | Pt (ppb) | Pd (ppb) | Rh (ppb) | TOTAL (ppb) |
|---|---|---|---|---|
| >212 μm | 1090 | 1720 | 227 | 3037 |
| >180 μm | 2500 | 2080 | 260 | 4840 |
| >150 μm | 1040 | 1620 | 291 | 2951 |
| >125 μm | 685 | 1230 | 213 | 2128 |

TABLE 2

| | Pt ppb | Pd ppb | Rh ppb | Total |
|---|---|---|---|---|
| Composition | 472 | 729 | 108 | 1309 |

The invention claimed is:

1. A method for increasing the concentration of platinum group metals in urban waste material comprising:
    obtaining particles of urban waste material;
    screening the particles of urban waste material by size;
    selecting particles of urban waste material that lie within a defined size range; and
    processing the selected particles using at least one physical or chemical technique whereby to increase the concentration of platinum group metals to at least 5 ppm,
    wherein the urban waste material is road dust.

2. A method according to claim 1, wherein the particles of urban waste material are dried prior to screening.

3. A method according to claim 1, wherein the screening step comprises sieving the particles of urban waste material.

4. A method according to claim 1, wherein the defined size range is 50 μm to 300 μm.

5. A method according to claim 1, wherein the size selected particles are processed by one or more physical separation techniques selected from magnetic separation, electrostatic separation and gravimetric concentration.

6. A method according to claim 5, wherein the size-selected particles are processed by magnetic separation.

7. A method according to claim 6, wherein the magnetic separation is high intensity induced roll magnetic separation.

8. A method according to claim 5, wherein the size selected particles are further processed by froth flotation.

9. A method according to claim 8, wherein the froth flotation uses chemical reagents which are capable of making particles of wash coat material present in the road dust hydrophobic.

* * * * *